United States Patent [19]

Nomura

[11] Patent Number: 5,251,201
[45] Date of Patent: Oct. 5, 1993

[54] OPTICAL DISK DEVICE

[75] Inventor: Tadashi Nomura, Tokyo, Japan
[73] Assignee: NEC Corporation, Tokyo, Japan
[21] Appl. No.: 732,550
[22] Filed: Jul. 19, 1991
[30] Foreign Application Priority Data
  Jul. 19, 1990 [JP] Japan .................................. 2-191755
[51] Int. Cl.$^5$ ............................................ G11B 17/08
[52] U.S. Cl. ........................................ 369/195; 369/198; 369/199
[58] Field of Search ............... 369/195, 199, 200, 198, 369/214, 215, 220, 140, 75.2

[56] References Cited

U.S. PATENT DOCUMENTS 5,105,418 4/1992 Kenmotsu et al. .................. 369/199

*Primary Examiner*—Paul M. Dzierzynski
*Assistant Examiner*—Don Wong
*Attorney, Agent, or Firm*—Sughrue, Mion, Zinn, Macpeak & Seas

[57] ABSTRACT

An optical disk device of the type having two optical heads for accessing both sides of an optical disk at the same time. The device has a loading mechanism which moves two subbases each carrying one of the two heads therewith in opposite directions, i.e., toward or away from an optical disk. The weight of one subbase and members mounted thereon and the weight of the other subbase and members mounted thereon act in opposite directions with respect to the drive force of the loading mechanism and thereby cancel each other.

5 Claims, 4 Drawing Sheets

OPTICAL DISK DEVICE

BACKGROUND OF THE INVENTION

The present invention relates to an optical disk device and, more particularly, to an optical disk device having two optical heads for accessing both sides of an optical disk at the same time.

A conventional optical disk device has only a single optical head. Although an optical disk device having two optical heads for accessing both sides of an optical disk at the same time has been extensively discussed, the discussion has been only conceptual and has not achieved any practical implementation. Nevertheless, an optical disk device with such a capability may be derived from the conventional device having a single optical head, as follows. A conventional optical disk device which accesses only one side of a disk and has a spindle motor for driving an optical disk, a first optical head for reading information out of the disk, and a main base on which the motor and first head may be additionally provided with a second optical head independent of the first head, and a subbase for carrying the second head therewith. Then, the device is capable of accessing both sides of a disk at the same time by moving each of the first and second heads to a predetermined position.

However, in the above construction, a magnetic circuit for driving the first optical head should also be mounted on the subbase. This brings about a drawback that the overall weight of the subbase is increased to result in the need for a bulky and large-output loading mechanism for moving the subbase.

SUMMARY OF THE INVENTION

It is therefore an object of the present invention to provide an optical disk device capable of accessing both sides of an optical disk at the same time with two optical disks.

It is another object of the present invention to provide an optical disk device which can be implemented with a miniature and small-output loading mechanism.

It is another object of the present invention to provide a generally improved optical disk device.

An optical disk device capable of accessing both sides of an optical disk at the same time of the present invention comprises a first optical head assembly comprising a first optical head for writing or reading information in or out of one side of the disk, a first subbase member supporting the first optical assembly thereon, a second optical head assembly comprising a second optical head for writing or reading information in or out of the other side of the disk, a second subbase member supporting the second optical head assembly thereon, a loading mechanism for selectively driving the first and second subbase members toward or away from the disk, and a main base supporting the first and second subbase members thereon.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
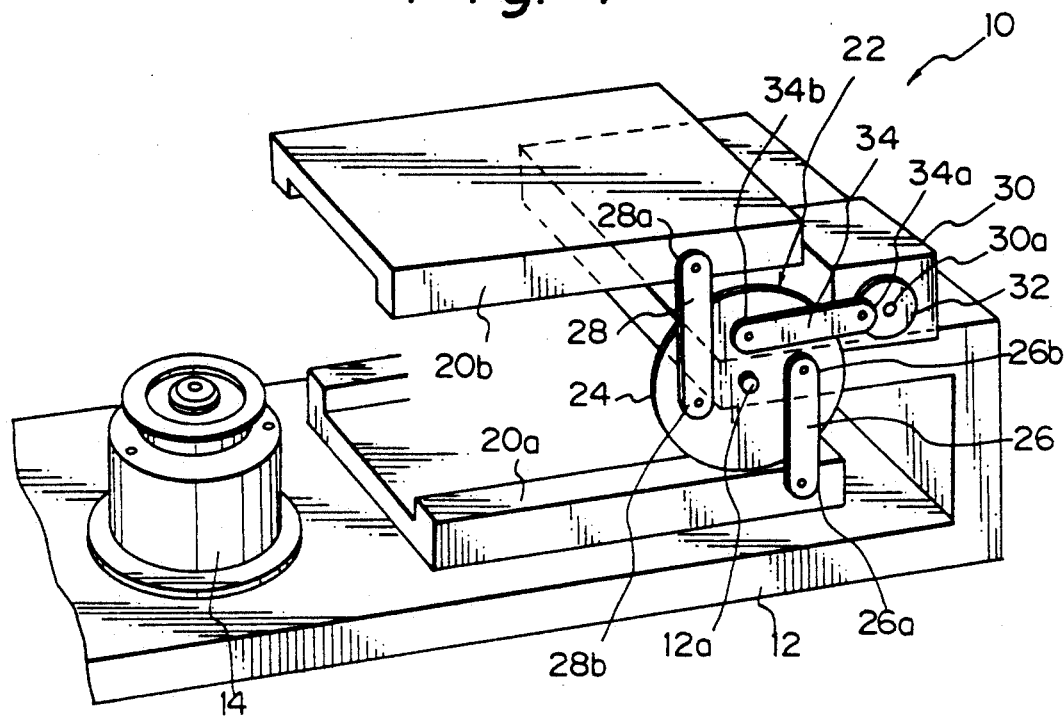
FIG. 1 is a perspective view of an optical disk device embodying the present invention.

Referring to FIG. 1 of the drawings, an optical disk device embodying the present invention is shown and generally designated by the reference numeral 10. As shown, the device 10 has a main base 12 supported by the casing of equipment, not shown, on which the device 10 is mounted. A spindle 14 is affixed to the main base 12. An optical disk 16 inserted into the device 10 is removably mounted on the spindle 14.

A first optical head assembly 18A is mounted on a first subbase 10a and so located as to face one side or lower surface 16a of the disk 16. The head assembly 18A has a first optical head 18a. A second optical head assembly 18B is mounted on a second subbase 20b and has a second optical head 18b. This head assembly 18B is located to face the other side or upper surface 16b of the disk 16. The first and second subbases 20a and 20b are connected to a loading mechanism 22. The loading mechanism 22 includes a disk 24 which is rotatably supported by a stub 12a extending out from part of the main base 12. A first link 26 is rotatably connected at one end 26a to the first subbase 20a and at the other end 26b to one point of the peripheral portion of the disk 24. A second link 28 is rotatably connected at one end 28a to the second subbase 20b and at the other end 28b to another point of the above-mentioned peripheral portion of the disk 24 which is diametrically opposite to the point where the first link 26 is connected. A gear motor 30 has an output shaft 30a on which another disk 32 is rigidly mounted. A drive link 34 is rotatably connected at one end 34a to the peripheral portion of the disk 32 and at the other end 34b to another point of the disk 24 which is located at an angular distance of about 90 degrees from both of the points where the first and second links 26 and 28 are connected to the disk 24.

In operation, as the gear motor 30 is rotated by a signal fed to the device 10 from its associated equipment, the disk 24 is rotated via the drive link 34 with the result that the points of the disk 24 where the first and second links 26 and 28 are connected move substantially in the up-and-down direction and in opposite directions to each other. Consequently, the first and second subbases 20a and 20b move in opposite directions to each other, i.e., toward or away from the optical disk 16. Specifically, after the optical disk 16 has been mounted on the spindle 14, the first head assembly 18A and the second head assembly 18B mounted on the subbases 20a and 20b, respectively, each can be moved to a predetermined position for accessing the side 16a or 16b of the disk 16. On the other hand, when the optical disk 16 is to be inserted into or removed from the equipment, the head assemblies 18A and 18B each can be retracted to a predetermined position spaced apart from the disk 16 by a predetermined distance. At this instant, the weight of the first subbase 20a and the weight of the head assembly 18a and other members mounted on the subbase 20a act on the disk 24 via the first link 26, tending to rotate the disk 24 clockwise, as viewed in the figures. At the same time, the weight of the second subbase 20b and the weight of the head assembly 18B and other members mounted on the subbase 20b act on the disk 24 via the second link 28, tending to rotate the disk 24 counterclockwise. Since such two different forces tending to rotate the disk 24 in opposite directions cancel each other, the load acting on the gear motor 30 connected to the disk 24 by the drive link 34 is extremely small. The gear motor 30, therefore, can be implemented as a miniature small-output motor.

With the above-described loading mechanism, the illustrative embodiments realizes an optical disk device capable of accessing both sides 16a and 16b of the optical disk 16 at the same time.

Figure 3:
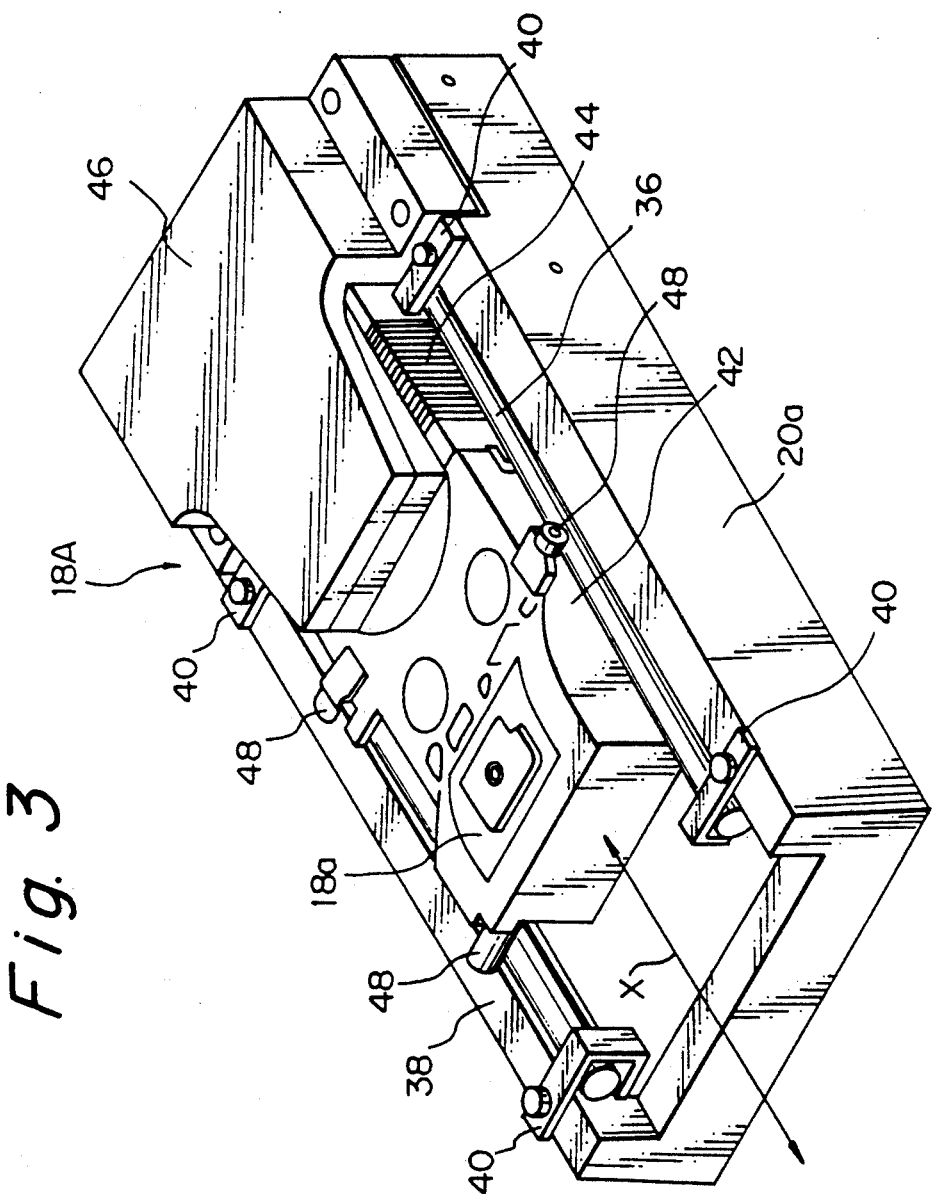
FIG. 3 is a perspective view of a first subbase included in the embodiment together with members mounted on the subbase.

The first and second subbases 20a and 20b loaded with, respectively, the first and second optical head assemblies 18A and 18B as well other members have a substantially identical construction. Specifically, as shown in FIG. 3, two spaced guide rails 36 and 38 are mounted on the first subbase 20a to allow the head assemblies 18A and 18B to move therealong in a direction indicated by an arrow X. The guide rails 36 and 38 each is affixed to the subbase 20a by a plurality of fastening members 40. The first head assembly 18A is made up of a support member 42 supporting the head 18a and provided with a winding 44, and a magnetic circuit 46 located in close proximity to the winding 44. A plurality of rollers 48 are mounted on the support member 42. In this configuration, when a magnetic force generated by the winding 44 and magnetic circuit 46 acts on the head assembly 18A, the rollers 48 of the support member 42 roll on the guide rails 36 and 38 to move the head assembly 18A in the direction X for thereby accessing the optical disk 16.

While the embodiment has been shown and described as comprising a single loading mechanism 22, the output of the gear motor 30 may be distributed to a plurality of loading mechanisms in order to insure the smooth operations of the device 10 despite the frictional forces particular to the movement of the subbases 20a and 20b.

Of course, the loading mechanism 22 which drives the subbases 20a and 20b up and down may be accompanied by an auxiliary mechanism for preventing the subbases 20a and 20b from shifting in the other directions.

Further, the linkage constituting the loading mechanism 22 in the embodiment may be replaced with a rack and pinion mechanism, a wire and pulley mechanism, a mechanism using a ball screw, or any other suitable mechanism.

Figure 2:
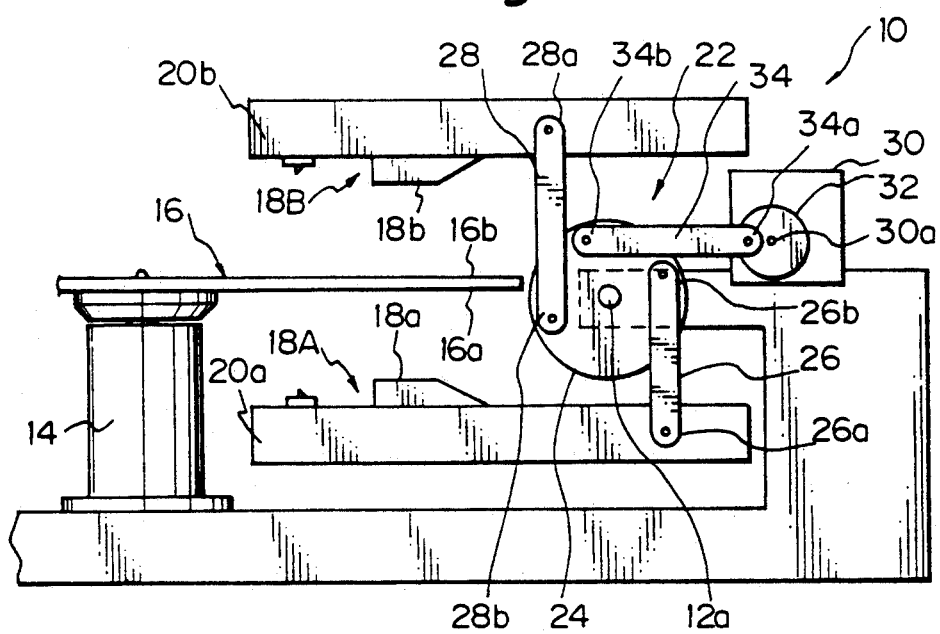
FIG. 2 is a side elevation demonstrating the operation of the embodiment.
Figure 4:
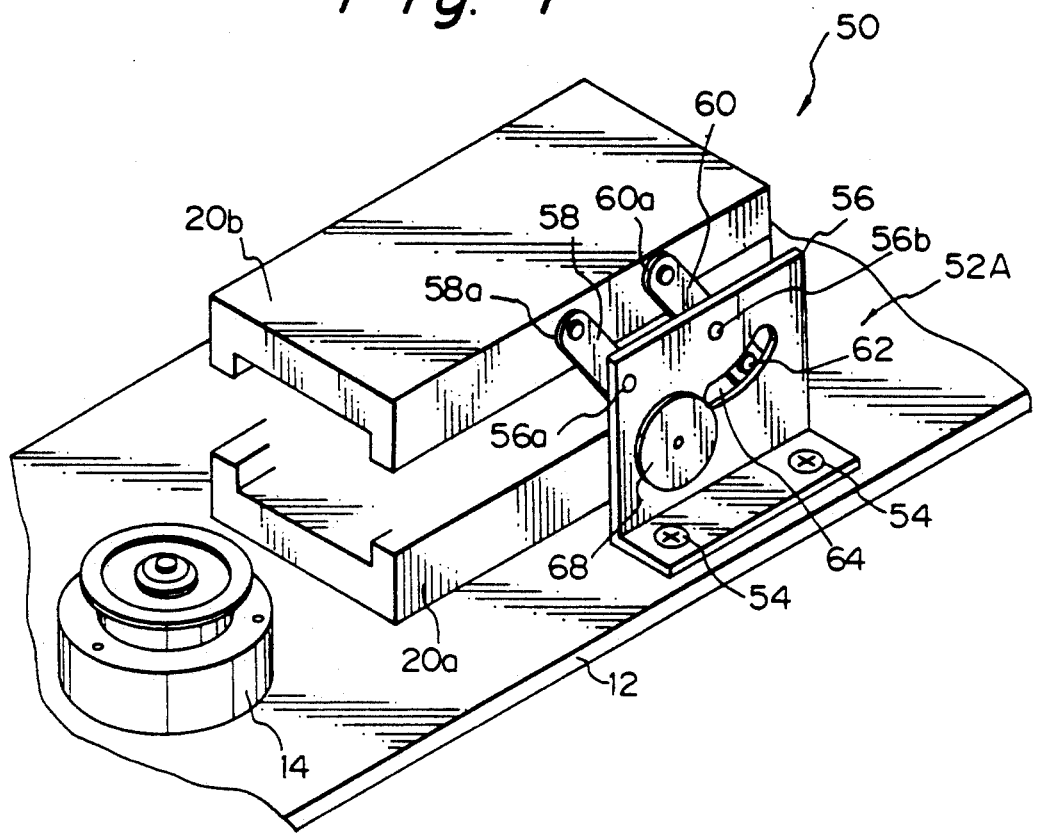
FIG. 4 is a view similar to FIG. 1, showing an alternative embodiment of the present invention.
Figure 6:
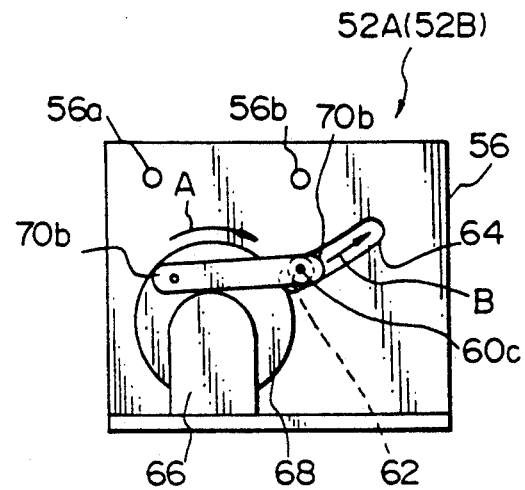
Figure 7:
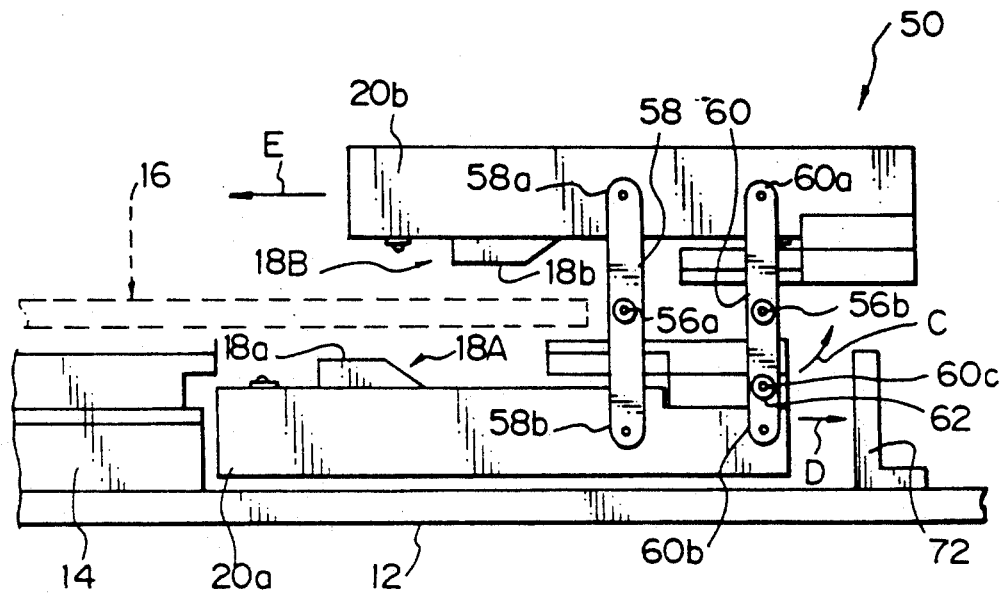
FIGS. 7 and 8 are side elevations corresponding to FIGS. 6 and 5, respectively.
Figure 8:
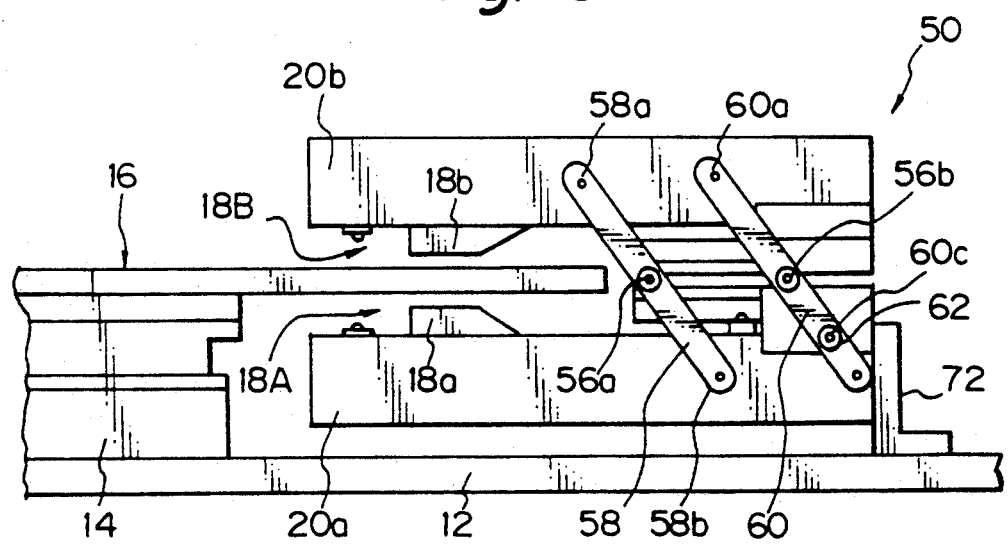

Referring to FIGS. 4 through 8, an alternative embodiment of the present invention is shown. In these figures, the structural parts and elements essentially identical with those shown in FIGS. 1 and 2 are designated by the same reference numerals, and redundant description will be avoided for simplicity. As shown in FIG. 4, the optical disk device, generally 50, has two loading mechanisms 52A and 52B (only 52A is visible). The loading mechanisms 52A and 52B are mounted on the main base 12 together with the spindle 14 and the first and second subbases 20a and 20b. As shown in FIG. 8, the optical disk 16 is removably mounted on the spindle 14. The first and second optical head assemblies 18A and 18B are constructed as shown in FIG. 3 and mounted on the subbases 20a and 20b, respectively.

Figure 5:
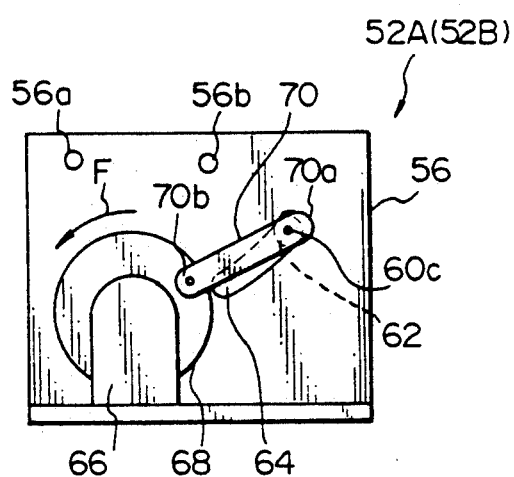
FIGS. 5 and 6 are views representative of the operation of a loading mechanism included in the embodiment of FIG. 4.

As shown in FIGS. 4 through 6, the loading mechanisms 52A and 52B each has a generally L-shaped side plate 56 which is fastened to the main base 12 at the lower end or leg thereof. A first and a second link 58 and 60 are rotatably connected to, respectively, stubs or fulcrums 56a and 56b provided on the side plate 56. One end 58a of the first link 58 is rotatably connected to the second subbase 20b. The other end 58b of the first link 58 is rotatably connected to the first subbase 20a, as shown in FIGS. 7 and 8. Likewise, the second link 60 is rotatably connected at one end 60a to the second subbase 20b and at the other end 60b to the first subbase 20a, as shown in FIGS. 7 and 8. As shown in FIGS. 7 and 8, a stub 60c extends from the second link 60 between the fulcrum 56b and end 60b while a roller 62 is rotatably mounted on the stub 60c. The roller 62 is received in a slot 64, FIGS. 4 through 6, formed in the side plate 56. The roller 62, therefore, is movable along the slot 64 while rolling along the edges of the latter. As shown in FIGS. 4 through 6, a disk 68 is mounted on the side plate 56 and rotated by a drive motor 66 in a rotary motion. A drive link 70, FIGS. 5 and 6, is rotatably connected at one end 70a to the stub 60c of the second link 60 and at the other end to the peripheral portion of the disk 68. In this construction, as the disk 68 is rotated by the drive motor 66, the second link 60 is rotated about the fulcrum 56b via the drive link 70. As a result, the first and second subbases 20a and 20b are rotated in opposite directions to each other, i.e., toward or away from the optical disk 16. The drive motor 66, disk 68, drive link 70, slot 64 of the side plate 56 and roller 62 of the second link 60 may be omitted in one of the loading mechanisms 52A and 52B.

More specifically, FIG. 7 shows the condition of the device 50 in which the optical disk 16 is not mounted on the spindle 14. In this condition, the loading mechanisms 52A and 52B each assumes a position shown in FIG. 6. FIG. 8 shows the device 50 in a position for accessing the optical disk 16 which is mounted on the spindle 14, and this position corresponds to the position shown in FIG. 5. In the position shown in FIGS. 6 and 7, as the motor 66 is driven by an externally derived signal to rotate the disk 68 in a direction indicated by an arrow A in FIG. 6, the drive link 70 moves the stub 60c of the second link 60 along the slot 64 via one end 70a thereof. As a result, the roller 62 moves in a direction indicated by an arrow B, rolling along the edges of the slot 64. The second link 60, therefore, rotates about the fulcrum 56b counterclockwise, as indicated by an arrow C in FIG. 7. The first link 58 follows such a movement of the second link 60, i.e., it rotates counterclockwise about the fulcrum 56a. Consequently, the first and second subbases 20a and 20b move respectively in directions D and E toward each other. As soon as the first subbase 20a abuts against a stop 72 provided on the main base 12, the position shown in FIG. 8 is set up to allow the head assemblies 18A and 18B to access the optical disk 16. After the access to the optical disk 16 has been completed, the motor 66 rotates the disk 68 in a direction F, FIG. 5, so that the subbases 20a and 20b are moved from the position of FIG. 8 to the position of FIG. 7 via the drive link 70, roller 62 and second link 60. In this condition, the optical disk 16 may be removed from the spindle 14.

In summary, it will be seen that the present invention provides an optical disk device having a loading mechanism which moves two subbases each carrying a single optical head therewith in opposite directions to each other, i.e., toward or away from an optical disk for thereby accessing both sides of the disk at the same time. The weight of one subbase and members mounted thereon and the weight of the other subbase and members mounted thereon act in opposite directions with respect to the drive force of the loading mechanism. Hence, the device of the present invention reduces the load acting on the loading mechanism and is, therefore, practicable with a miniature and small-output loading mechanism.

Various modifications will become possible for those skilled in the art after receiving the teachings of the present disclosure without departing from the scope thereof.

What is claimed is:

1. An optical disk device capable of accessing data recorded on both sides of an optical disk simultaneously, said device comprising:

a main base;

a first subbase member supported on said main base;

a first optical head assembly comprising a first optical head for writing information to, or reading information from, one side of said optical disk, said first optical head assembly being supported on said first subbase member;

a second subbase member supported on said main base;

a second optical head assembly comprising a second optical head for writing information to, or reading information from, the other side of said optical disk, said second optical head assembly being supported on said second subbase member;

loading means for selectively driving said first and second subbase members toward or away from said optical disk, said loading means comprising drive means for generating a drive force and transmitting means for transmitting said drive force from said drive means to said first and second subbase members;

said transmitting means comprising a disk rotatably mounted about a fulcrum point on said main base, a first link having one end which is rotatably connected to said first subbase member and another end which is rotatably connected to a first peripheral point of said disk, a second link having one end which is rotatably connected to said second subbase member and another end which is connected to a second peripheral point of said disk, said second peripheral point being diametrically opposite said first peripheral point, and a drive link having one end which is rotatably connected to a third peripheral point of said disk, said third peripheral point being located at an angular distance of substantially 90 degrees from both said first and second peripheral points, another end of said drive link being connected to said drive means.

2. A device as claimed in claim 1, wherein said drive means comprises a gear motor having an output shaft, and an output disk rigidly mounted on said output shaft of said gear motor, said other end of said drive link being rotatably connected to the peripheral portion of said output disk.

3. A device as claimed in claim 2, wherein said first subbase member is movably coupled to said disk of said transmitting means via said first link so as to generate a first rotating force, due to the weight of said first subbase member, which is imparted to said disk through said first link and wherein said second subbase member is movably coupled to said disk of said transmitting means via said second link so as to generate a second rotating force, due to the weight of the second subbase member, which is imparted to said disk through said second link, said first and second rotating forces being imparted to said disk in opposition to one another so as to cancel each other out.

4. An optical disk device capable of accessing data recorded on both sides of an optical disk simultaneously, said device comprising:

a main base;

a first subbase member supported on said main base;

a first optical head assembly comprising a first optical head for writing information to, or reading information from, one side of said optical disk, said first optical head assembly being supported on said first subbase member;

a second subbase member supported on said main base;

a second optical head assembly comprising a second optical head for writing information to, or reading information from, the other side of said optical disk, said second optical head assembly being supported on said second subbase member;

loading means for selectively driving said first and second subbase members toward or away from said optical disk, said loading means comprising drive means for generating a drive force and transmitting means for transmitting said drive force from said drive means to said first and second subbase members;

said transmitting means comprising at least one side plate affixed to said main base and having an elongated slot formed therein, first and second links each rotatably connected, at an intermediate portion thereof, to a respective one of first and second fulcrum points defined on said side plate, said first and second links each being rotatably connected at one end thereof to said first subbase member and being rotatably connected at the other end thereof to said second subbase member, a stub extending from said first link at a position which is between said first fulcrum and said one end of first link, a roller rotatably connected to said stub and received in said elongated slot so as to move along said elongated slot in response to rotation of said first link about said fulcrum, and a drive link having one end which is rotatably connected to said stub and another end which is connected to said drive means.

5. A device as claimed in claim 4, wherein said drive means comprises a motor having an output shaft, and an output disk rigidly mounted on said output shaft of said motor, said other end of said drive link being rotatably connected to the peripheral portion of said output disk.

* * * * *